United States Patent [19]

Fitzgerald, Jr. et al.

[11] 3,711,738

[45] Jan. 16, 1973

[54] HIGH VOLTAGE AND WIDTH REGULATION CIRCUIT

[75] Inventors: William Vincent Fitzgerald, Jr., Indianapolis; Richard Charles Lemmon, West Lafayette, both of Ind.

[73] Assignee: RCA Corporation

[22] Filed: May 1, 1971

[21] Appl. No.: 148,661

[52] U.S. Cl. ..........................315/29, 315/18, 315/22

[51] Int. Cl. ..........................................H01j 29/70

[58] Field of Search..............................315/18, 22, 29

[56] References Cited

UNITED STATES PATENTS

| | | | |
|---|---|---|---|
| 2,843,796 | 7/1958 | Schade | 315/22 |
| 2,944,186 | 7/1960 | Boekhorst et al. | 315/27 R |
| 3,077,550 | 2/1963 | Macovski | 315/22 |
| 3,388,286 | 6/1968 | Austin et al. | 315/29 |
| 3,459,993 | 8/1969 | Mayor et al. | 315/29 |
| 3,629,644 | 12/1971 | Waybright | 315/22 |

*Primary Examiner*—Benjamin R. Padgett
*Assistant Examiner*—P. A. Nelson
*Attorney*—Eugene M. Whitacre

[57] ABSTRACT

Uncontrolled variations in the beam current drawn by the cathode-ray picture tube of a television receiver can cause such increases in the high voltage developed for its ultor electrode as will present problems of X-radiation. These uncontrolled variations can also result in a loading of the horizontal deflection circuits of the receiver and cause the reproduced image to change in width. The described circuit operates to limit such undesired effects, both in the presence of these changes in beam current and, also, in the presence of variations in line voltage. A transistor referenced against ground potential is employed to develop a control voltage for the screen grid of the horizontal output tube and to provide the primary amplification needed to compensatingly offset these changes. Pulses developed across a secondary winding of the horizontal output transformer are monitored to establish the conduction state of the transistor to provide the desired control.

7 Claims, 2 Drawing Figures

INVENTORS
William V. Fitzgerald
& Richard C. Lemmon
BY Charles Brodsky
ATTORNEY

HIGH VOLTAGE AND WIDTH REGULATION CIRCUIT

BACKGROUND OF THE INVENTION

1. Field of the Invention

This invention relates to television receivers and, more particularly, to apparatus for stabilizing its operation against such variation in the beam current drawn by its picture tube and in the applied line voltage as may cause excessive increase in high voltage and in image width distortion.

2. Description of the Prior Art

One circuit for providing high voltage and width stabilization is disclosed in U.S. Pat. No. 3,427,496 to Wood. As is there described, pulses obtained from the horizontal output transformer of a television receiver are fed back to the screen grid circuit of its horizontal driver tube in an attempt to maintain the power output of the tube at a relatively stable level. Because of the stabilization of the driver tube output which results— and because of the loading effect of the feedback circuit utilized—, the amplitude of the transformer pulses are stated to be stabilized. Since the horizontal deflecting coils are driven by these pulses in the horizontal output transformer, the stabilizing effect on the amplitude of the developed pulses is said to additionally provide stability in the picture width exhibited.

As is discussed in that specification, a resistor is connected in series between the screen grid of the driver tube and a source of B+ supply potential while a diode is serially connected with a blanking winding of the horizontal output transformer across the screen grid resistor. The diode is so poled that any increase in beam current which decreases the amplitude of the pulses in a primary winding of the output transformer and the amplitude of the blanking winding pulses also decreases the conduction of the diode; this change in conduction is in a direction to correspondingly cause a decrease in the direct voltage drop across the resistor and an increase in the direct screen voltage, to offsettingly increase the output current of the driver tube and the amplitude of the pulses in the horizontal output transformer in a compensating manner. Where the beam current requirements decrease, on the other hand, the loading of the high voltage also decreases, and in a direction tending to increase the amplitude of the pulses supplied by the horizontal output tube; the amplitude of the blanking winding pulses and the conduction of the diode increase, as a result, and cause an increase in the direct voltage drop across the resistor and a decrease in the applied screen grid voltage. The output current of the horizontal driver is thus reduced, and in a manner to once again stabilize the amplitude of the pulses supplied to the horizontal output transformer.

As a more detailed reading of the U.S. Pat. No. 3,427,496 reference will show, its described operation relies on a properly operating horizontal driver tube, since it represents the only source of amplification available to provide the disclosed compensation. That is, if the screen transconductance of the tube or its screen current should vary—either from circuit to circuit as a result of tolerance variations during tube manufacture, or within a given circuit as a result of aging or temperature changes—then the offsetting action will not necessarily result. Because the circuit values are selected so that the amplitude of the blanking winding pulse during normal receiver operation is just sufficient to overcome an established back bias on the diode, any variations in tube parameters which affect the conduction voltage of the diode will deleteriously affect the subsequent high voltage stabilization when conditions change. Because of the X-radiation problems associated with high voltage, however, it would be more desirable if the stabilization afforded could proceed without this dependence on tube parameters which exhibit such tendency to vary. In addition, it would be desirable if the arrangement provided could afford its stabilization independent of any line voltage variations which might affect the value of any B+ supply potentials. With the arrangement of this prior art patent, variations in line voltage correspondingly vary the direct screen grid voltage and, consequently, the high voltage against which substantial protection must be accorded.

SUMMARY OF THE INVENTION

As will become clear hereinafter, the high voltage and width regulation circuit of the present invention provides such regulation, independent of line voltage change and of variations in the screen grid parameters of the horizontal driver tube. As will be seen, a transistor is employed, with its emitter electrode being referenced to ground potential and with its base electrode being supplied with a control voltage obtained through rectification of a pulse obtained from a secondary winding on the horizontal output transformer. With the collector electrode of the transistor being directly connected to the screen grid electrode of the tube and, also, to a source of screen bias potential by a resistor, any factors which would tend to affect the amplitude of the horizontal output pulse will correspondingly alter this feedback pulse to produce an offsetting change in transistor conductivity and resulting bias at the screen grid. In particular, any change in tube parameters which varies either the high voltage or the image width will be sensed as a change in the rectified voltage fed back to the transistor, and since the transistor exhibits an amplification factor very much greater than that exhibited by the driver tube itself, its amplification response will be such as to make the resultant tube amplification change substantially negligible. At the same time, any variations in line voltage which would tend to vary the bias voltage supplied to the screen grid are also reflected in the amplitude of the feedback pulse developed, and causes a compensating change in transistor conductivity to offset such variations.

BRIEF DESCRIPTION OF THE DRAWINGS

These and other features of the instant invention will be more clearly understood from a consideration of the following description taken in conjunction with the accompanying drawings in which.

DETAILED DESCRIPTION OF THE PREFERRED EMBODIMENTS

Figure 1:
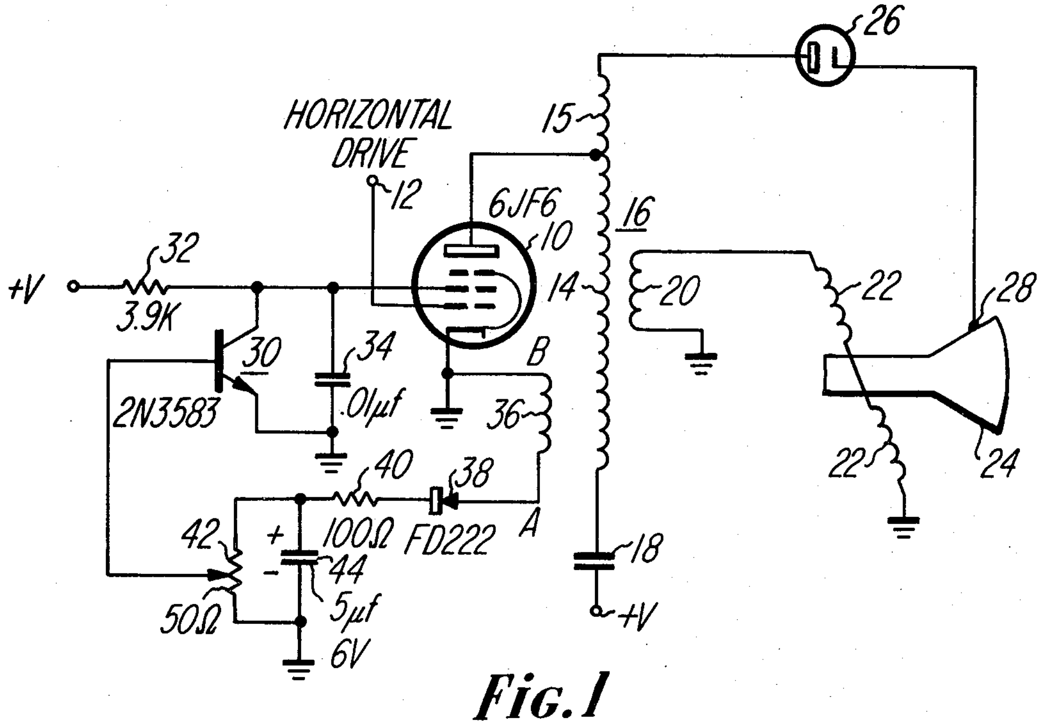
FIG. 1 shows one embodiment of a high voltage and width regulation circuit constructed in accordance with the present invention.

In FIG. 1, the horizontal driver tube is represented by the reference numeral 10 as having a control grid coupled to the output of a horizontal oscillator at an input terminal 12. The cathode of tube 10 is directly connected to ground while the anode of the tube is connected via a terminal 15 on a primary winding 14 of the horizontal output transformer 16 to a source of energizing potential +V, by means of a capacitor 18. A secondary winding 20 of the horizontal output transformer 16 is also shown, with its low potential end being connected to ground and with its high potential end being coupled to the horizontal deflection coils 22 of a cathode-ray kinescope 24. A high voltage rectifier tube 26 provides the ultor electrode 28 of tube 24 with its necessary voltage, by a direct connection to electrode 28 from its cathode, while a direct connection is made between the anode of the rectifier and the high potential end of the primary winding 14.

Also shown in FIG. 1 is a transistor 30 having an emitter electrode directly connected to ground and a collector electrode connected to the screen grid of tube 10. A resistor 32 couples the collector electrode of transistor 30 and the screen grid of tube 10 to the +V potential source, while a bypass capacitor 34 couples the screen grid to ground. A tertiary winding 36 of the horizontal output transformer 16 is included to couple developed flyback pulses to a circuit including a semiconductor rectifier 38 serially connected with a variable voltage divider including a fixed resistor 40 and a variable resistor or potentiometer 42. As indicated, the variable arm on the potentiometer 42 is directly connected to the base electrode of transistor 30 while a capacitor 44 is coupled across the variable device. The cathode of rectifier 38 is coupled, as shown, to resistor 40 while its anode is connected to the winding 36, such that, with winding 36 coupled to the primary winding 14 in a manner to produce positive going pulses at its terminal A relative to its grounded terminal B in response to like polarity pulses in winding 14, rectifier 38 and capacitor 44 cooperate to produce a positive bias voltage for the transistor 30.

In the operation of the FIG. 1 circuit, it will be appreciated that any increase in beam current has a tendency to load the high voltage derived through the rectifier tube 26, the effect of which is a reflection into the transformer winding 14 to decrease the amplitude of the pulses supplied from the output of the horizontal driver tube 10. This decrease in amplitude of the pulses in the winding 14 induces a corresponding decrease in the positive pulses in the feedback winding 36. Since semiconductor rectifier 38 and capacitor 44 rectify and filter this decreased amplitude pulse to a direct current voltage which is divided by the ratio of the resistances of resistors 40 and 42 in its application to the base electrode of transistor 30, it follows that the conduction of transistor 30 will decrease, to thereby decrease the direct voltage drop across resistor 32. Because this resistor supplies the bias control voltage from the +V source to the screen grid of the driver tube 10, such decrease in transformer pulse amplitude effectively increases the screen voltage applied which, in turn, compensatingly increases the output current of the tube. This increase in output current serves to offsettingly increase the amplitude of the pulses in the transformer winding 14, and in a direction tending to stabilize the high voltage output of the rectifier tube 26.

As the beam current requirements decrease, on the other hand, the loading of the high voltage also decreases and the amplitude of the pulses supplied to the transformer winding 14 by the horizontal output tube 10 tends to increase. In a manner analagous to that previously described, the corresponding increase in pulse amplitude in winding 36 tends to cause an increase in the direct voltage applied to the base electrode of transistor 30, to increase its conduction and, in turn, increase the direct voltage drop across resistor 32. A decrease in the screen grid control voltage thus results, decreasing the output of the driver tube 10, and in a direction to once again stabilize the amplitude of the pulses supplied to the transformer primary 14. The variation in screen grid voltage in either instance of loading will thus be seen to be a variation in opposite sense to the changes in the direct level of the rectified voltage developed by the combination of the components 38–44.

Since the width of the image in the cathode-ray kinescope 24 is determined by the amplitude of the pulses supplied to the horizontal deflection windings 22—and because the pulses supplied to these deflection windings are supplied from the winding 20 on the same core as the primary winding 14 of the horizontal output transformer—it follows that the width of the image will be stabilized to the same degree that the pulse amplitude will be stabilized in the transformer winding 14. Because the potentiometer 42 can serve to adjustably vary the bias voltage at transistor 30 and, consequently, the pulse amplitude in the winding 14, such device functions as a picture width regulator and can be located as a service control on the receiver.

Figure 2:
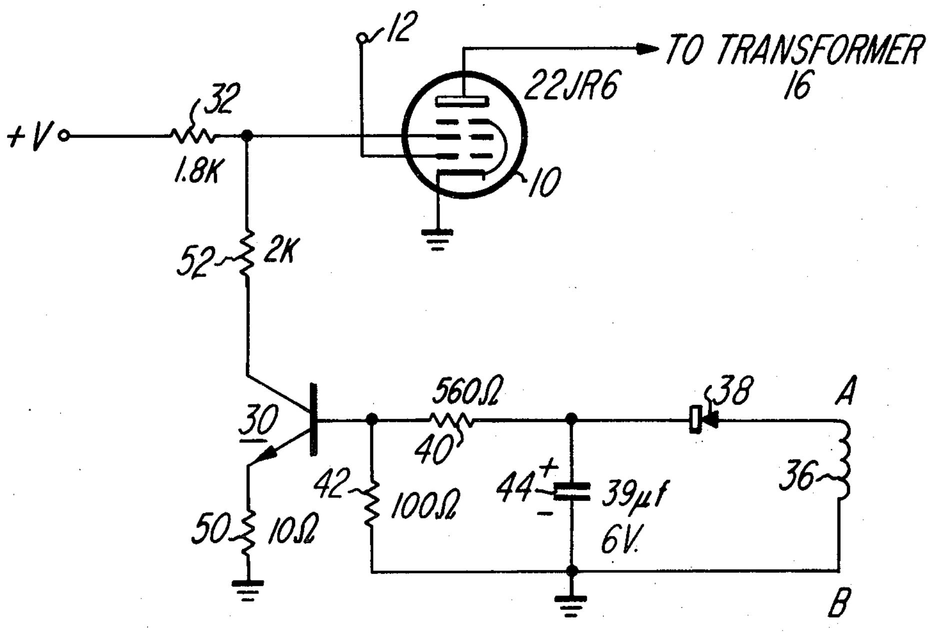
FIG. 2 shows a modified arrangement of the circuit of FIG. 1.

The arrangement of FIG. 2 represents a modification of the FIG. 1 circuit in that the filter capacitor 44 is connected to the cathode terminal of the rectifier 38 rather than to the junction of the resistance devices 40, 42 and also, in that the resistance device 42 is maintained fixed. A stabilizing resistor 50 is coupled to the emitter electrode circuit of transistor 30 while a further resistor 52 is additionally included to couple the collector electrode of the transistor to the screen grid of the tube.

The operation of this arrangement is similar to the operation of the arrangement of FIG. 1 with the exception that the picture width is now stabilized at a fixed value instead of being subject to regulated control. Such stabilization feature is particularly attractive in minimizing possible X-radiation problems which might otherwise tend to arise through high voltage changes as the voltage division to the base electrode of transistor 30 is varied. By proper selection of the resistance ratio, the direct voltage fed back to control the conduction of transistor 30 can be made effective to establish the high voltage versus beam current characteristics of the illustrated circuit to fall well within the isodose curve limits promulgated by the Health, Education, and Welfare Department of the U.S. Government with respect to television receiver X-ray emission.

The described circuit arrangements prove advantageous over the prior art configuration of the aforenoted U.S. Pat. No. 3,427,496 in that the regulation afforded is relatively insensitive to changes in line voltage which produce variations in the energizing supply potential value. Thus, it will be noted that in the circuit of the reference, variations in line voltage will affect the compensating direct voltage fed to the screen grid electrode of the horizontal driver tube but will have substantially little effect on the amplitude of the pulses initially supplied to the horizontal output transformer; consequently, the value of the developed high voltage will vary as a function of line voltage irrespective of the beam current requirements which vary with scene content. With the arrangement of this invention, however, it will be seen that the line voltage changes not only affect the value of the energizing potential supply coupled to the screen grid of the horizontal driver tube 10, but also the amplitude of the feedback pulses utilized in providing the compensation; this follows because the feedback pulses are referenced in amplitude to the same energizing potential as the screen grid by virtue of the coupling to the common value potential supplies as illustrated in the drawings.

At the same time, it will be seen that most of the offsetting gain in the described circuits is provided by the operation of the transistor 30, rather than by the internal transconductance characteristics of the horizontal driver tube—as with the prior noted reference. Any screen transconductance characteristic variations which may result in the driver tube are thus far more capable of causing problems in the prior circuit than in the arrangements illustrated herein in FIGS. 1 and 2. In like manner, proper operation of the circuit of the U.S. Pat. No. 3,427,496 patent requires the selection of resistor and diode characteristics to be made in conjunction with the screen current of the driver tube employed since it is the point of diode conduction which governs the described stabilization. As such screen current can vary from tube to tube of the same type classification due to tolerances in the manufacturing process (and can vary as well due to temperature and aging changes), the afforded stabilization there provided will not be as tight as needs be required in order to prevent these variations from giving rise to high voltage changes which cause X-radiation problems. Again, with the present invention, the effects of the change in tube characteristics will be minimal as compared with the offsetting compensation provided by the transistor 30, so that tube aging or manufacturing differences will offer substantially little change in circuit operation. In effect, it will be seen that the compensation afforded by the present scheme follows any variation in amplitude caused by these, or other circuit effects, with the increased amplification of the transistor 30 serving to compensate for such changes irrespective of the manner in which the changes arose. With the prior arrangement, on the other hand, any problems caused by the changes in characteristics of the horizontal driver tube are not offset by any arrangement as it is the tube itself which is necessary to provide the desired corrective features.

While there has been described what are considered to be preferred embodiments of the present invention, it will be readily apparent that other modifications may be made by those skilled in the art without departing from the spirit of the teachings herein. Thus, it will be evident that if transformer windings are used to cause the induced feedback pulses to be negative-going, the transistor and diode polarities would have to be reversed in order to give corresponding operation. These matters are submitted to be obvious to workers in the art, and not such matters as will affect the scope of the invention as set forth in the foregoing specification.

What is claimed is:

1. In a high voltage and image width regulation circuit of the type wherein changes in amplitude of pulses induced in a secondary winding of a horizontal output transformer are monitored and converted to offsetting changes in a bias voltage applied to the screen grid electrode of a horizontal driver tube to vary the output current it supplies to said transformer in a direction to regulate the amplitude of pulses developed in a primary winding thereof in response to the application of deflection signals to the control grid electrode of said tube, the combination therewith of:

a normally conducting transistor having an input electrode, a control electrode, and an output electrode which is coupled intermediate said screen grid electrode and a source of bias potential;

means for monitoring the amplitude of said secondary winding pulses and for rectifying said pulses to a direct voltage representative of the amplitude thereof;

and means for applying said direct voltage to the control electrode of said transistor to alter its conduction and cause its output electrode to vary the bias voltage applied by said source of potential to said screen grid electrode in a direction opposite to the variations in rectified direct voltage provided by said monitoring means as said secondary winding pulse amplitudes change.

2. The combination of claim 1 wherein said last-mentioned means includes means for varying the magnitude of the direct voltage applied to the control electrode of said transistor to alter the bias voltage applied by said source to said screen grid electrode, the amplitude of pulses developed in said output transformer primary winding, and the width of a reproduced television image.

3. The combination of claim 1 wherein said normally conducting transistor has an input emitter electrode coupled to a point of reference potential, and output collector electrode coupled to said screen grid electrode and via an included first resistor to said source of bias potential, and a control base electrode coupled to receive said applied direct voltage to alter the conductivity of said transistor as said secondary winding pulse amplitudes change.

4. The combination of claim 1 wherein said monitoring means includes a semiconductor rectifier having an input electrode coupled to a high potential terminal of said transformer secondary winding and an output electrode serially coupled via an included capacitor to a low potential terminal of said secondary winding.

5. The combination of claim 2 wherein said direct voltage magnitude varying means includes a voltage divider network having an adjustably variable impedance for regulating the magnitude of direct voltage applied to said control electrode in response to said rectified pulse amplitude representations.

6. The combination of claim 3 wherein the input emitter electrode of said transistor is directly connected to said point of reference potential, wherein the output collector electrode of said transistor is directly connected to said screen grid electrode and via said first resistor to said source of bias potential, and wherein the control base electrode of said transistor is directly connected to the variable arm of a potentiometer having a resistance element forming part of a voltage divider network with a second resistor to adjustably vary the magnitude of direct voltage applied to said base electrode in response to said rectified pulse amplitude representations, to alter the bias voltage applied to said screen grid electrode, the amplitude of pulses developed in said output transformer primary winding, and the width of a reproduced television image.

7. The combination of claim 3 wherein the input emitter electrode of said transistor is coupled via a second resistor to said point of reference potential, wherein the output collector electrode of said transistor is coupled via a third resistor to said screen grid electrode and via said first resistor to said source of bias potential, and wherein the control base electrode of said transistor is directly connected to an output terminal of a voltage divider network selected to fixedly reduce the magnitude of direct voltage applied to said base electrode in response to said rectified pulse amplitude representations to stabilize the amplitude of pulses developed in said output transformer at a predetermined value.

* * * * *

UNITED STATES PATENT OFFICE
CERTIFICATE OF CORRECTION

Patent No. 3,711,738 Dated January 16, 1973

Inventor(s) William Vincent Fitzgerald, Jr., et al.

It is certified that error appears in the above-identified patent and that said Letters Patent are hereby corrected as shown below:

On the title page, under "Filed", that portion reading "May 1, 1971" should read -- June 1, 1971 --.

Signed and sealed this 6th day of August 1974.

(SEAL)
Attest:

McCOY M. GIBSON, JR.
Attesting Officer

C. MARSHALL DANN
Commissioner of Patents

FORM PO-1050 (10-69)
3530 6/72

USCOMM-DC 60376-P69
☆ U.S. GOVERNMENT PRINTING OFFICE : 1969 O—366-334